(12) United States Patent
Choi et al.

(10) Patent No.: US 12,374,728 B2
(45) Date of Patent: Jul. 29, 2025

(54) BATTERY PACK AND BATTERY RACK AND ENERGY STORAGE SYSTEM COMPRISING THE SAME

(71) Applicant: LG ENERGY SOLUTION, LTD., Seoul (KR)

(72) Inventors: Jee-Soon Choi, Daejeon (KR); Dal-Mo Kang, Daejeon (KR); Jae-Dong Park, Daejeon (KR); Sang-Hoon Lee, Daejeon (KR); Hyun-Ki Cho, Daejeon (KR); Yong-Seok Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 649 days.

(21) Appl. No.: 17/639,742

(22) PCT Filed: Jul. 13, 2020

(86) PCT No.: PCT/KR2020/009217
§ 371 (c)(1),
(2) Date: Mar. 2, 2022

(87) PCT Pub. No.: WO2021/045376
PCT Pub. Date: Mar. 11, 2021

(65) Prior Publication Data
US 2022/0294035 A1    Sep. 15, 2022

(30) Foreign Application Priority Data
Sep. 3, 2019    (KR) .................... 10-2019-0109047

(51) Int. Cl.
*H01M 10/6572*    (2014.01)
*H01M 10/44*    (2006.01)
*H02J 7/00*    (2006.01)

(52) U.S. Cl.
CPC ....... *H01M 10/44* (2013.01); *H02J 7/007182* (2020.01)

(58) Field of Classification Search
CPC .. H01M 10/44; H01M 10/486; H01M 10/443; H01M 50/204; H01M 50/572;
(Continued)

(56) References Cited

U.S. PATENT DOCUMENTS

2003/0027036 A1* 2/2003 Emori ................ H02J 7/00304
337/16
2010/0127662 A1   5/2010 Ha et al.
(Continued)

FOREIGN PATENT DOCUMENTS

| CN | 108169543 A | 11/2016 |
| CN | 107431254 A | 12/2017 |

(Continued)

OTHER PUBLICATIONS

Extended European Search Report for European Application No. 20859764.1, dated Jan. 20, 2023.
(Continued)

*Primary Examiner* — Nghia M Doan
(74) *Attorney, Agent, or Firm* — Birch, Stewart, Kolasch & Birch, LLP

(57) ABSTRACT

A battery pack includes at least one battery module including a plurality of battery cells, and a module housing to receive the plurality of battery cells, at least one thermoelectric module disposed outside or inside of the module housing of the battery module and configured to generate voltage when a temperature of the battery module rises to a predetermined temperature or above, and an energy drain unit configured to discharge the battery module when a predetermined magnitude of voltage or above is applied from the thermoelectric module.

16 Claims, 16 Drawing Sheets

(58) Field of Classification Search
CPC ............. H01M 10/613; H01M 10/637; H01M 50/251; H01M 10/6572; H01M 10/627; H01M 10/657; H01M 10/659; H01M 50/244; H01M 50/258; H01M 2220/10; H02J 7/007182; H02J 7/00309; H02J 7/0031; Y02E 60/10

See application file for complete search history.

(56) References Cited

U.S. PATENT DOCUMENTS

| | | | |
|---|---|---|---|
| 2010/0194346 A1* | 8/2010 | Lee | H02J 7/00306 320/136 |
| 2011/0121787 A1 | 5/2011 | Kim et al. | |
| 2011/0157755 A1 | 6/2011 | Honkura | |
| 2011/0287285 A1 | 11/2011 | Yoon | |
| 2013/0098416 A1 | 4/2013 | Savelli et al. | |
| 2013/0106173 A1 | 5/2013 | Nomura | |
| 2015/0037648 A1 | 2/2015 | Nguyen et al. | |
| 2016/0349675 A1 | 12/2016 | Yamamoto et al. | |
| 2018/0175640 A1 | 6/2018 | Lee | |

FOREIGN PATENT DOCUMENTS

| | | |
|---|---|---|
| JP | 11-191436 A | 7/1999 |
| JP | 2961853 B2 | 10/1999 |
| JP | 2002-141112 A | 5/2002 |
| JP | 2002-320339 A | 10/2002 |
| JP | 2004-63397 A | 2/2004 |
| JP | 2007-141511 A | 6/2007 |
| JP | 2010-108899 A | 5/2010 |
| JP | 2012-230813 A | 11/2012 |
| JP | 2013-4212 A | 1/2013 |
| JP | 2013-98132 A | 5/2013 |
| JP | 2013-528941 A | 7/2013 |
| JP | 2014-39431 A | 2/2014 |
| JP | 2014-116178 * | 6/2014 |
| JP | 2014-116178 A | 6/2014 |
| JP | 2016-224200 A | 12/2016 |
| KR | 10-2003-0008507 A | 1/2003 |
| KR | 10-0614392 B1 | 8/2006 |
| KR | 10-0906249 B1 | 7/2009 |
| KR | 10-2011-0128639 A | 11/2011 |
| KR | 10-2013-0046359 A | 5/2013 |
| KR | 10-2013-0060758 A | 6/2013 |
| KR | 10-2013-0060949 A | 6/2013 |
| KR | 10-1430134 B1 | 8/2014 |
| KR | 10-2016-0121213 A | 10/2016 |
| KR | 10-1858990 B1 | 5/2018 |
| WO | WO 2006/115342 A1 | 11/2006 |
| WO | WO 2007/011175 A1 | 1/2007 |

OTHER PUBLICATIONS

International Search Report (PCT/ISA/210) issued in PCT/KR2020/009217 mailed on Oct. 28, 2020.

Indian Office Action and Examination Report for Indian Application No. 202217020057, dated Jun. 19, 2024, with English translation.

* cited by examiner

BATTERY PACK AND BATTERY RACK AND ENERGY STORAGE SYSTEM COMPRISING THE SAME

TECHNICAL FIELD

The present disclosure relates to a battery pack, and a battery rack and an energy storage system comprising the same, and more particularly, to a battery pack with improved stability against thermal runaway of a battery module.

The present application claims the benefit of Korean Patent Application No. 10-2019-0109047 filed on Sep. 3, 2019 with the Korean Intellectual Property Office, the disclosure of which is incorporated herein by reference in its entirety.

BACKGROUND ART

Currently, commercially available secondary batteries include nickel-cadmium batteries, nickel-hydrogen batteries, nickel-zinc batteries, lithium secondary batteries and the like, and among them, lithium secondary batteries have little or no memory effect, and thus they are gaining more attention than nickel-based secondary batteries for their advantages that recharging can be done whenever it is convenient, the self-discharge rate is very low and the energy density is high.

A lithium secondary battery primarily uses lithium-based oxide and a carbon material as a positive electrode active material and a negative electrode active material respectively. The lithium secondary battery includes an electrode assembly including a positive electrode plate and a negative electrode plate coated with the positive electrode active material and the negative electrode active material respectively with a separator interposed between the positive electrode plate and the negative electrode plate, and a packaging or a battery pouch case in which the electrode assembly is hermetically received together with an electrolyte solution.

Recently, secondary batteries are widely used not only in small devices such as portable electronic devices, but also in medium- and large-sized devices such as vehicles and energy storage systems. For use in medium- and large-sized device applications, many secondary batteries are electrically connected to increase the capacity and output. In particular, pouch-type secondary batteries are easy to stack, and due to the advantage, they are widely used in medium- and large-sized devices.

More recently, with the use as a source of energy and the growing need for large-capacity structures, there is an increasing demand for a battery pack including a battery module including a plurality of secondary batteries electrically connected in series and/or in parallel and a battery management system (BMS).

In general, the battery pack includes an external housing made of metal to protect the plurality of secondary batteries from external impacts or receive and store them. In recent years, there is a rising demand for high-capacity battery packs.

However, the conventional battery pack or battery rack includes a plurality of battery modules, and when thermal runaway occurs in some of the plurality of secondary batteries of each battery module, causing a fire or explosion, heat or flames spread to adjacent secondary batteries, causing secondary explosion. Efforts are made to prevent fires or explosions from spreading.

Accordingly, when thermal runaway occurs in a certain secondary battery of the battery pack or battery rack, quick and perfect fire suppression technology is necessary to take prompt countermeasures. To prevent the thermal runaway of the battery module, there are methods for cooling or fire suppression of the battery module through the control of the BMS.

However, when external power is not supplied to the BMS or the BMS fails or malfunctions, cooling or fire suppression through the control of the BMS may fail to cool or extinguish a fire in the battery module in which thermal runaway occurred. Accordingly, there is a need for fire extinguishing measures when the BMS is inoperable.

DISCLOSURE

Technical Problem

The present disclosure is designed to solve the above-described problem, and therefore the present disclosure is directed to providing a battery pack with improved stability against thermal runaway of a battery module.

These and other objects and advantages of the present disclosure can be understood by the following description, and will be apparent from the embodiments of the present disclosure. In addition, it will be readily appreciated that the objects and advantages of the present disclosure can be realized by means and combinations thereof.

Technical Solution

To achieve the above-described object, a battery pack according to the present disclosure includes at least one battery module including a plurality of battery cells, and a module housing to receive the plurality of battery cells, at least one thermoelectric module disposed outside or inside of the module housing of the at least one battery module and configured to generate voltage when a temperature of the at least one battery module rises to a predetermined temperature or above, and an energy drain configured to discharge the at least one battery module when a predetermined magnitude of voltage or above is applied from the at least one thermoelectric module.

Additionally, the module housing may have at least one exposure hole that is open for communication between inside and outside, and the at least one thermoelectric module may be disposed in contact with the exposure hole.

Additionally, the at least one thermoelectric module may include a thermoelectric leg including a p-type leg and an n-type leg, an electrode connecting the p-type leg and the n-type leg, and a hot side substrate and a cold side substrate formed in a plate shape and disposed at upper and lower positions of the electrode, respectively, to electrically isolate the electrode from outside.

Additionally, the at least one thermoelectric module may be disposed outside of the module housing, and at least part of the hot side substrate may be inserted into the exposure hole.

Additionally, the module housing may have a receiving groove recessed in an inward direction to receive the at least one thermoelectric module, and the at least one thermoelectric module may be mounted in the receiving groove such that the cold side substrate is disposed on the receiving groove.

Additionally, the energy drain may include an external short-circuiting circuit electrically connected to an external power terminal of the at least one battery module to drain power of the at least one battery module when the predetermined magnitude of voltage or above is applied from the at least one thermoelectric module.

Additionally, the external short-circuiting circuit may include a drain configured to drain the power supplied from the at least one battery module, and at least one operating switch configured to electrically connect the at least one battery module to a resistor when the predetermined voltage or above is supplied.

Additionally, the external short-circuiting circuit may further include a changing switch that is turned on when supplied with the predetermined voltage or above from the at least one thermoelectric module, to supply the power of the at least one battery module to the operating switch in order to turn on the operating switch.

Additionally, the operating switch may include a positive electrode connection electrically connected to a positive electrode terminal of the at least one battery module, a negative electrode connection electrically connected to a negative electrode terminal of the at least one battery module, a connecting bar configured to electrically connect the positive electrode connection to the negative electrode connection, and a movement element configured to move the connecting bar when the power of the predetermined voltage or above is supplied to the changing switch, so that the connecting bar comes into contact between the positive electrode connection and the negative electrode connection.

Additionally, the movement element may include a heating body which rises to the predetermined temperature or above by the power supplied to the operating switch, a phase change element having a first end connected to the heating body and the a second end connected to the connecting bar, wherein the phase change element changes a phase from a solid state to a liquid state at the predetermined temperature or above, and a press spring having a first end connected to the connecting bar and a second end connected to the heating body, and configured to press to move the connecting bar when the phase change element changes to the liquid state.

Additionally, the movement element may include a heating body which rises to the predetermined temperature or above by the power supplied to the operating switch, and an expandable part having a first end connected to the heating body and a second end connected to the connecting bar, and configured to move the connecting bar by volume expansion at the predetermined temperature or above.

Additionally, the external short-circuiting circuit may include an auxiliary battery to supply the predetermined voltage or above, and a changing switch that is turned on when supplied with the predetermined voltage or above from the at least one thermoelectric module, to supply the predetermined voltage or above of the auxiliary battery to the operating switch in order to turn on the operating switch.

Additionally, the operating switch may be a transistor switch configured to electrically connect the at least one battery module to the resistor when supplied with the predetermined voltage or above from the at least one thermoelectric module.

To achieve the above-described object, a battery rack according to the present disclosure includes the battery pack and a rack case to receive the battery pack.

To achieve the above-described object, an energy storage system according to the present disclosure includes at least one battery rack.

Advantageous Effects

According to an aspect of the present disclosure, the battery pack of the present disclosure includes the energy drain unit configured to discharge the battery module when a predetermined magnitude of voltage or above is applied from the thermoelectric module by the temperature rise of the battery module to a predetermined temperature or above. The active method drains the energy of the battery module using a temperature sensor or a smoke sensor, while the passive method drains the energy of the battery module by the voltage rise of the thermoelectric module with the temperature change of the battery module. The present disclosure can use both the active method and the passive method, thereby handling thermal runaway or explosion of the battery module with high reliability.

According to an aspect of an embodiment of the present disclosure, the battery pack of the present disclosure may have the exposure hole for communication between the inside and the outside of the battery module, to allow the thermoelectric module to effectively receive the internal heat of the battery module, and thus the energy drain unit may discharge the battery module by quickly responding to the temperature change of the battery module. Accordingly, it is possible to effectively increase the safety of the battery pack.

According to another aspect of the present disclosure, the battery module of the present disclosure has the receiving groove recessed in the inward direction to receive the thermoelectric module in the module housing. The thermoelectric module does not extend out of the battery module, and thus can avoid the obstruction or collision with an external object. Accordingly, it is possible to prevent the damage of the thermoelectric module, resulting in increased durability of the battery pack.

According to still another aspect of the present disclosure, the energy drain unit of the present disclosure includes the drain part to drain the power of the battery module and the external short-circuiting circuit including at least one operating switch, and when the operating switch electrically connects the battery module and the drain part by the predetermined voltage or above transmitted by the thermoelectric module, the power of the battery module is effectively used up. Accordingly, it is possible to prevent the proliferation or spread of fires in the battery module of the battery pack.

According to yet another aspect of the present disclosure, the energy drain unit of the present disclosure further includes the changing switch which is turned on when supplied with the predetermined voltage or above from the thermoelectric module, to supply the power of the battery module to the operating switch to turn on the operating switch, and when the operating switch electrically connects the battery module and the resistor by the predetermined voltage or above transmitted by the battery module, an external short-circuit is induced with high reliability. Accordingly, it is possible to effectively use up the power of the battery module.

BRIEF DESCRIPTION OF THE DRAWINGS

The accompanying drawings illustrate preferred embodiments of the present disclosure, and together with the following detailed description, serve to provide a further understanding of the technical spirit of the present disclosure. However, the present disclosure is not to be construed as being limited to the drawings.

DETAILED DESCRIPTION

Figure 1:
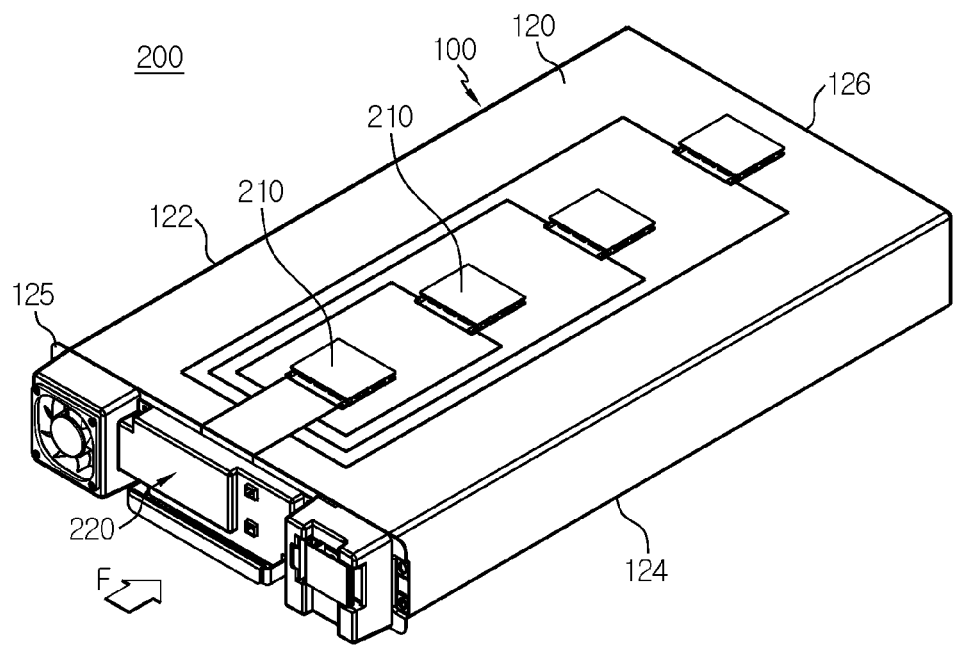
FIG. 1 is a schematic perspective view of a battery pack according to an embodiment of the present disclosure.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation.

Therefore, the embodiments described herein and illustrations shown in the drawings are just a most preferred embodiment of the present disclosure, but not intended to fully describe the technical aspects of the present disclosure, so it should be understood that a variety of other equivalents and modifications could have been made thereto at the time that the application was filed.

Figure 2:
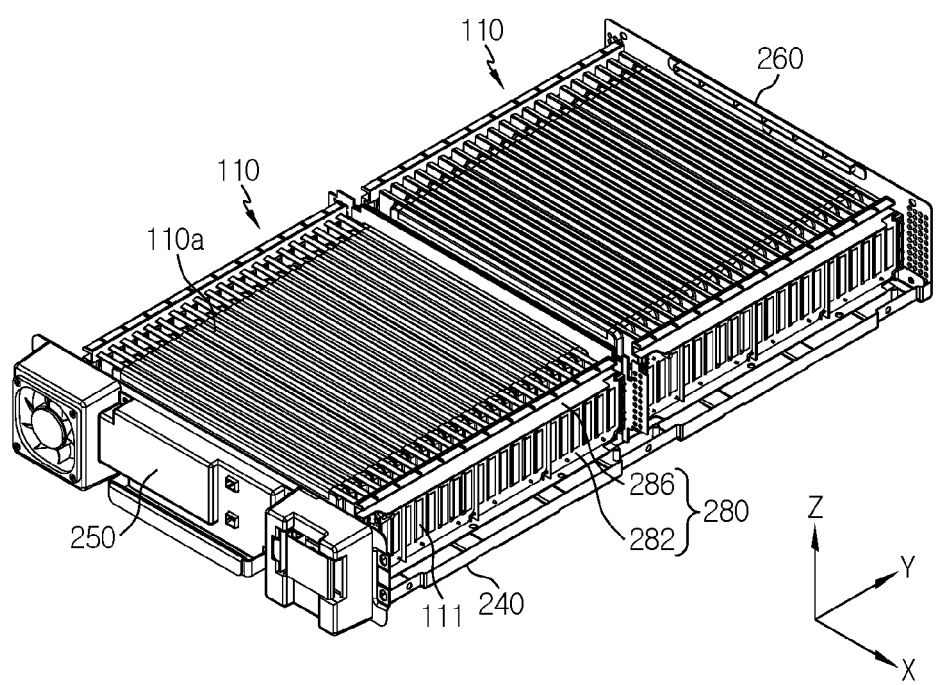
FIG. 2 is a schematic exploded perspective view of the internal components of a battery pack according to an embodiment of the present disclosure.

FIG. 1 is a schematic perspective view of a battery pack according to an embodiment of the present disclosure. FIG. 2 is a schematic exploded perspective view of the internal components of the battery pack according to an embodiment of the present disclosure.

The battery pack 200 according to the present disclosure includes at least one battery module 100 including a plurality of battery cells 110a, at least one thermoelectric module 210 and an energy drain unit 220.

Here, the battery cell 110a may be a pouch-type secondary battery. For example, as shown in FIG. 2, each of 2 cell assemblies 110 may include 21 pouch-type battery cells 110a stacked side by side in the front-rear direction (y direction).

In particular, the pouch-type battery cell 110a may include an electrode assembly (not shown), an electrolyte solution (not shown) and a pouch.

Each battery cell 110a stands in a direction (z direction) perpendicular to the ground with two wide surfaces disposed in the front-rear direction and sealing portions disposed in the up, down, left and right directions, when viewed in the direction F (shown in FIG. 1). In other words, each battery cell 110a may stand upright in the vertical direction. In the specification, unless otherwise specified, the up, down, front, rear, left, and right directions are defined when viewed from the direction F.

Here, the pouch may have a concave receiving portion. The electrode assembly and the electrolyte solution may be received in the receiving portion. Each pouch may include an outer insulating layer, a metal layer and an inner insulating layer, and the inner adhesive layers adhere to each other at the edges of the pouch to form a sealing portion. A terrace portion may be formed at each of the left and right ends (x direction) at which a positive electrode lead 111 and a negative electrode lead (not shown) of the battery cell 110a are formed.

The electrode assembly may be an assembly of an electrode plate coated with an electrode active material and a separator, and may include at least one positive electrode plate and at least one negative electrode plate with the separator. The positive electrode plate of the electrode assembly may have a positive electrode tab, and at least one positive electrode tab may be connected to the positive electrode lead 111.

Here, the positive electrode lead 111 may have one end connected to the positive electrode tab and the other end exposed through the pouch, and the exposed portion may serve as an electrode terminal of the battery cell 110a, for example, a positive electrode terminal of the battery cell 110a.

The negative electrode plate of the electrode assembly may have a negative electrode tab, and at least one negative electrode tab may be connected to the negative electrode lead (not shown). The negative electrode lead may have one end connected to the negative electrode tab and the other end exposed through the pouch, and the exposed portion may serve as an electrode terminal of the battery cell 110a, for example, a negative electrode terminal of the battery cell 110a.

As shown in FIG. 2, when viewed in the direction F of FIG. 1, the positive electrode lead 111 and the negative electrode lead may be formed at the left and right ends in opposite directions (x direction) with respect to the center of the battery cell 110a. That is, the positive electrode lead 111 may be provided at one end (the right end) with respect to the center of the battery cell 110a. The negative electrode lead may be provided at the other end (the left end) with respect to the center of the battery cell 110a. For example, as shown in FIG. 2, each battery cell 110a of the cell assembly 110 may have the positive electrode lead 111 and the negative electrode lead extending in the left-right direction.

Here, the terms representing the directions such as front, rear, left, right, up, and down may vary depending on the position of the observer or the placement of the object. However, in the specification, for convenience of description, the directions such as front, rear, left, right, up, and down are defined when viewed from the direction F of FIG. 1.

According to this configuration of the present disclosure, it is possible to increase the area of the electrode lead without interference between the positive electrode lead 111 and the negative electrode lead of one battery cell 110a.

The positive electrode lead 111 and the negative electrode lead may be formed in a plate shape. In particular, the positive electrode lead 111 and the negative electrode lead may extend in the horizontal direction (X direction) with the wide surfaces standing upright in the front-rear direction.

Here, the horizontal direction refers to a direction parallel to the ground when the battery module 100 is placed on the ground, and may be referred to as at least one direction on a plane perpendicular to the vertical direction (Z direction).

However, the battery module 100 according to the present disclosure is not limited to the pouch-type battery cell 110a described above and may use various types of battery cells 110a known at the time of filing the application.

The at least two cell assemblies 110 may be arranged in the front-rear direction. For example, as shown in FIG. 2, the 2 cell assemblies 110 may be arranged in the front-rear direction, and they may be spaced a predetermined distance apart from each other.

The battery module 100 may further include a busbar assembly 280. In detail, the busbar assembly 280 may include at least one busbar 282 configured to electrically connect the plurality of battery cells 110a and at least two busbar frames 286 configured to mount the at least one busbar 282 on the outer side. The at least two busbar frames 286 may be respectively disposed on the left and right sides of the cell assembly 110.

In detail, the busbar 282 may include a conductive metal, for example, copper, aluminum and nickel.

The busbar frame 286 may include an electrical insulating material. For example, the busbar frame 286 may include a plastic material. In more detail, the plastic material may be polyvinyl chloride.

The module housing 120 may have an internal space to receive the cell assembly 110 therein. In detail, the module housing 120 may include an upper cover 122, a base plate 124, a front cover 125 and a rear cover 126. Each of the upper cover 122, the base plate 124, the front cover 125 and the rear cover 126 may be bolt-coupled to each other.

According to this configuration of the present disclosure, the module housing 120 has a structure that stably protects the plurality of battery cells 110a from external impacts, thereby increasing the safety of the battery module 100 against external impacts.

Figure 3:
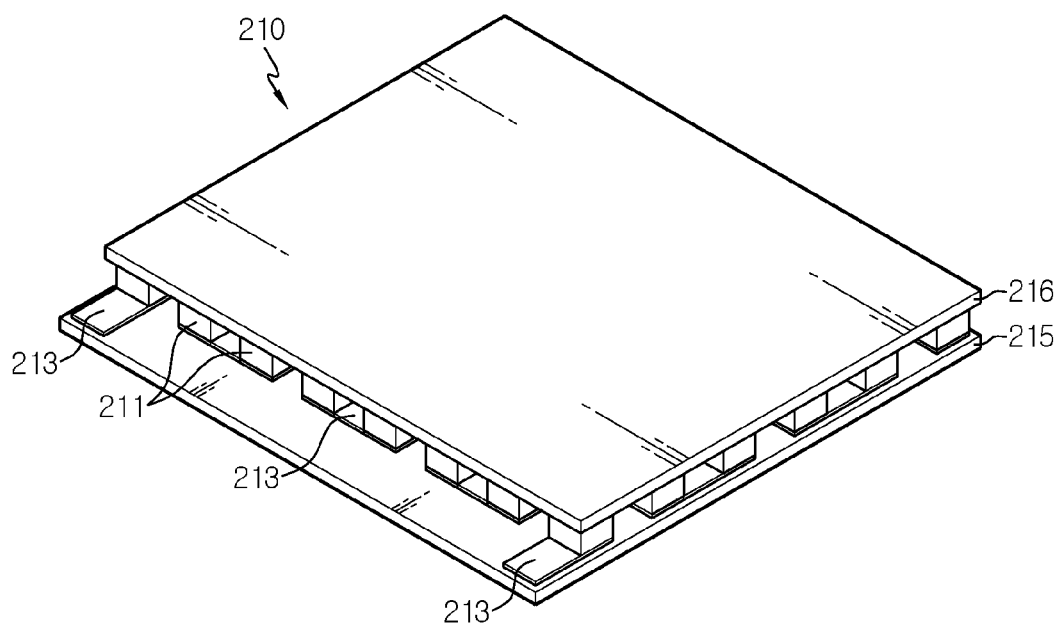
FIG. 3 is a schematic perspective view of a thermoelectric module of a battery pack according to an embodiment of the present disclosure.
Figure 4:
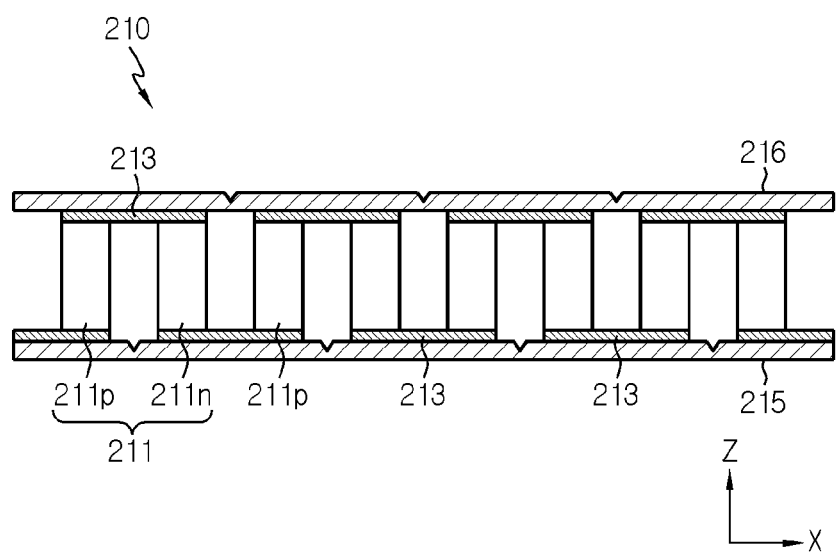
FIG. 4 is a schematic vertical cross-sectional view of a thermoelectric module of a battery pack according to an embodiment of the present disclosure.

FIG. 3 is a schematic perspective view of the thermoelectric module of the battery pack according to an embodiment of the present disclosure. FIG. 4 is a schematic vertical cross-sectional view of the thermoelectric module of the battery pack according to an embodiment of the present disclosure.

Referring to FIGS. 3 and 4 together with FIG. 1, the thermoelectric module 210 may be configured to be disposed on the outer or inner side of the module housing 120 of the battery module 100. That is, the thermoelectric module 210 may be configured to generate a predetermined voltage according to a change in the internal or external temperature of the battery module 100. For example, when the temperature of the battery module 100 rises to a predetermined temperature or above, the increased heat may be transmitted to the thermoelectric module 210 and generate the predetermined voltage or above. For example, the predetermined temperature may be 100° C. or above. Alternatively, the predetermined temperature may be 200° C. or higher.

Here, the thermoelectric module 210 includes a thermoelectric leg 211, a lower electrode 213, an upper electrode 213, a lower substrate 215 as a hot side substrate and an upper substrate 216 as a cold side substrate.

The thermoelectric leg 211 may be made of a thermoelectric material, i.e., a thermoelectric semiconductor. The thermoelectric semiconductor may include various types of thermoelectric materials, for example, chalcogenide-based, skutterudite-based, silicide-based, clathrate-based and Half heusler-based thermoelectric materials. In the case of the thermoelectric module 210 according to the present disclosure, various types of thermoelectric semiconductors may be used as the material of the thermoelectric leg 211.

The thermoelectric leg 211 may include an n-type leg 211n and a p-type leg 211p. The n-type leg 211n may move the heat energy by the electron movement, and the p-type leg 211p may move the heat energy by the hole movement.

Here, the n-type leg 211n may include an n-type thermoelectric material, and the p-type leg 211p may include a p-type thermoelectric material. That is, the n-type leg 211n may be formed using an n-type dopant into the thermoelectric material. The p-type leg 211p may be formed using a p-type dopant into the thermoelectric material.

For example, the thermoelectric leg 211 may use a skutterudite-based thermoelectric material containing $CoSb_3$ as a basic component. The n-type dopant may include Ni, Pd, Pt, Te, Se. The p-type dopant may include Fe, Mn, Cr, Sn. Here, the n-type dopant may substitute the Sb site of $CoSb_3$, resulting in excess electrons, and the p-type dopant may substitute the Sb site of $CoSb_3$, resulting in holes.

The thermoelectric leg 211 according to the present disclosure may include a pair of p-type leg 211p and n-type leg 211n as a basic unit.

The thermoelectric leg 211 may be formed by sintering the thermoelectric material in bulk. For example, the thermoelectric leg 211 may be formed in a rod shape, i.e., a rectangular prism shape, as shown in FIG. 3. However, the present disclosure is not limited to a particular shape of the thermoelectric leg 211.

The p-type leg 211p and the n-type leg 211n may be manufactured through the steps of mixing each raw material, synthesis through thermal treatment and sintering. However, the present disclosure is not limited to a particular manufacturing method of the thermoelectric leg 211.

As shown in FIG. 3, the thermoelectric module 210 according to the present disclosure may include a plurality of thermoelectric legs 211, i.e., a plurality of p-type legs 211p and a plurality of n-type legs 211n. The plurality of p-type legs 211p and the plurality of n-type legs 211n may include different types of thermoelectric devices arranged in an alternating manner and connected to each other. In particular, the p-type leg 211p and the n-type leg 211n may be arranged in the horizontal direction on a plane (X-Y plane in the drawing), spaced a predetermined distance apart from each other.

The p-type leg 211p and the n-type leg 211n may be connected to each other through the electrode 213. That is, the upper end of each thermoelectric leg 211 may be joined to the upper electrode 213, and the lower end of each thermoelectric leg 211 may be joined to the lower electrode 213. Most of the thermoelectric legs 211 may have the upper end and the lower end connected to adjacent thermoelectric legs 211 of different types through the upper electrode 213 and the lower electrode 213.

The upper electrode 213 and the lower electrode 213 may be made of an electrically conductive material, and in particular, a metal. For example, the upper electrode 213 and the lower electrode 213 may include Cu, Al, Ni, Ti or their alloys. The upper electrode 213 and the lower electrode 213 may be formed in a plate shape. For example, the upper electrode 213 and the lower electrode 213 may be formed in the shape of a copper plate.

The upper electrode 213 and the lower electrode 213 may be provided between the p-type leg 211p and the n-type leg 211n to connect them. That is, the lower electrode 213 may have one end joined and connected to the lower end of the n-type leg 211n, and the other end joined and connected to the lower end of the p-type leg 211p. The upper electrode 213 may have one end joined and connected to the upper end of the n-type leg 211n, and the other end joined and connected to the upper end of the p-type leg 211p. That is, each of the upper electrode 213 and the lower electrode 213 may have two ends joined to different types of thermoelectric legs 211. As the upper electrode 213 and the lower electrode 213 have the two ends joined to the thermoelectric leg 211, the upper electrode 213 and the lower electrode 213 may be formed in the shape of a rectangular plate that is longer in a direction in order to easily join the thermoelectric leg 211 to the two ends.

The thermoelectric module 210 according to the present disclosure may a plurality of upper electrodes 213 and a plurality of lower electrodes 213. For example, the thermoelectric module 210 may include a plurality of thermoelectric legs 211, and in this case, the upper electrode 213 and the lower electrode 213 may be differently provided at the upper end and the lower end of each thermoelectric leg 211. Accordingly, each thermoelectric module 210 may include a plurality of upper electrodes 213 and a plurality of lower electrodes 213. In this case, the thermoelectric module 210 may include an electrode array.

The thermoelectric module 210 according to the present disclosure may use various types of thermoelectric legs 211 and/or electrodes 213.

The lower substrate 215 may include an electrical insulating material. Accordingly, the lower substrate 215 may electrically isolate the outer lower side of the thermoelectric module 210 from the lower electrode 213. In particular, the lower substrate 215 may be made of a ceramic material having high thermal conductivity. For example, the lower substrate 215 may include alumina ($Al_2O_3$) in whole or in part. The lower substrate 215 may be made of a ceramic material having thermal conductivity of 10 W/mK or above at 20° C. The lower substrate 215 may include a substrate layer made of an electrically conductive material, for example, a metal, coated with an electrical insulating material on the surface. The present disclosure is not limited to a particular material of the lower substrate 215, and may use various types of substrate materials known at the time of filing the application.

The lower substrate 215 may be formed in a plate shape. That is, the lower substrate 215 may have 2 wide surfaces. For example, the lower substrate 215 may be formed of an alumina plate.

The lower substrate 215 may be disposed below the lower electrode 213 and attached to the lower surface of the lower electrode 213. That is, the lower substrate 215 may be placed with 2 wide surfaces disposed at upper and lower positions, such that the upper surface is attached to the lower surface of the lower electrode 213.

Here, the lower substrate 215 may be attached to the lower surface of at least one of the plurality of lower electrodes 213 included in one thermoelectric module 210. For example, as shown in FIG. 3, the thermoelectric module 210 may include one lower substrate 215, and the upper surface of the lower substrate 215 may be joined to the lower surface of the lower electrode 213. Alternatively, the thermoelectric module 210 may include a plurality of lower substrates 215, and the upper surface of the lower substrate 215 may be joined to the lower surface of some lower electrodes 213.

In the same way as the lower substrate 215, the upper substrate 216 may include an electrical insulating material. Accordingly, the upper substrate 216 may electrically isolate the outer upper side of the thermoelectric module 210 from the upper electrode 213. The upper substrate 216 may be made of a ceramic material having high thermal conductivity, for example, alumina $Al_2O_3$, or the substrate layer may be made of an electrically conductive material coated with an electrical insulating material on the surface. The present disclosure is not limited to a particular type of material of the upper substrate 216, and may use various types of substrate materials known at the time of filing the application.

In the same way as the lower substrate 215, the upper substrate 216 may be formed in a plate shape. That is, the upper substrate 216 may have 2 wide surfaces. For example, the upper substrate 216 may be formed of an alumina plate.

The upper substrate 216 may be disposed on the upper electrode 213 and attached to the upper surface of the upper electrode 213. That is, the upper substrate 216 may be placed with 2 wide surfaces disposed at upper and lower positions, such that the lower surface is attached to the upper surface of the upper electrode 213.

Here, the upper substrate 216 may be attached to the upper surface of at least two of the plurality of upper electrodes 213 included in one thermoelectric module 210. For example, as shown in FIG. 3, the thermoelectric module 210 may include one upper substrate 216, and the lower surface of the upper substrate 216 may be joined to the upper surface of all the upper electrodes 213. Alternatively, the thermoelectric module 210 may include two or more upper substrates 216, and the lower surface of the upper substrates 216 may be joined to the upper surface of the at least two upper electrodes 213.

In general, the thermoelectric module 210 is disposed between the hot side and the cold side. Accordingly, one of the upper substrate 216 and the lower substrate 215 may be positioned on the hot side and the other may be positioned on the cold side. The terms 'upper' and 'lower' may be changed depending on the position of the thermoelectric module 210 or an observer, and for convenience of description, the present disclosure is described herein based on that the upper substrate 216 disposed on the cold side and the lower substrate 215 disposed on the hot side. That is, in the specification, the upper substrate 216 may be the cold side substrate, and the lower substrate 215 may be the hot side substrate.

The energy drain unit 220 may be configured to discharge the battery module 100 when the predetermined magnitude of voltage or above is applied from the thermoelectric module 210 in case that the battery module 100 rises to the predetermined temperature or above. The predetermined magnitude of voltage or above may be 1.2 V or above. For example, the energy drain unit 220 may be configured to apply power to a resistor 225a, a power resistor, or an electric motor to drain the power of the battery module 100.

According to this configuration of the present disclosure, the battery pack 200 of the present disclosure includes the energy drain unit 220 configured to discharge the battery module 100 when the predetermined magnitude of voltage or above is applied from the thermoelectric module 210 in case that the battery module 100 rises to the predetermined temperature or above, and thus as opposed to the active energy drain of the battery module 100 using a temperature sensor or a smoke sensor, it is possible to use the passive energy drain of the battery module 100 by the voltage rise of the thermoelectric module 210 with a temperature change of the battery module 100.

That is, the conventional battery pack 200 uses the active method that detects an abnormal condition of the battery module 100 using a battery management system (BMS) and drains the energy of the battery module 100, but when the BMS is not supplied with external power or the BMS is inoperable due to a failure, it is difficult to automatically cope with fires or explosions of the battery module 100.

Accordingly, the present disclosure is configured to cope with fires or explosions of the battery module 100 by the passive method using the thermoelectric module 210 that responds to a temperature change of the battery module 100, not the active configuration such as the BMS, thereby taking countermeasures when the BMS is inoperable. Accordingly, it is possible to greatly increase the safety of the battery pack 200.

Figure 5:
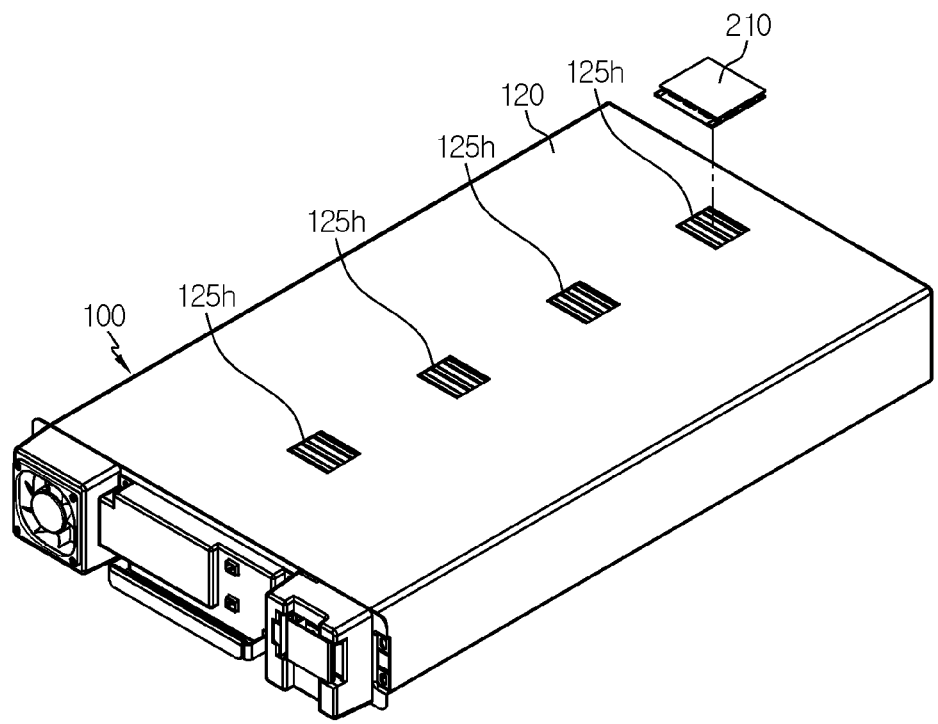
FIG. 5 is a schematic exploded perspective view of some components of a battery pack according to an embodiment of the present disclosure.

FIG. 5 is a schematic exploded perspective view of some components of the battery pack according to an embodiment of the present disclosure.

Referring to FIG. 5, the module housing 120 may have at least one exposure hole 125h through which the inside and the outside are in communication with each other. For example, as shown in FIG. 5, the module housing 120 of the battery module 100 may have 4 exposure holes 125h. As shown in FIG. 5, the thermoelectric module 210 may be disposed in contact with the exposure hole 125h. The exposure hole 125h may be smaller in size than the lower substrate 215 of the thermoelectric module 210.

The thermoelectric module 210 may be disposed on the outer side of the module housing 120, and at least part of the hot side substrate 215 (the lower substrate) may be inserted into the exposure hole 125h. In this instance, the exposure hole 125h may have the plane size equal or similar to the lower substrate 215 so that the lower substrate 215 of the thermoelectric module 210 is inserted into the exposure hole 125h.

According to this configuration of the present disclosure, the battery pack 200 of the present disclosure has the exposure hole 125h through which the inside and the outside of the battery module 100 are in communication with each other, thereby effectively transmitting the internal heat of the battery module 100 to the thermoelectric module 210, and the energy drain unit 220 may discharge the battery module 100 in response to a temperature change of the battery module 100. Accordingly, it is possible to effective increase the safety of the battery pack 200.

Figure 6:
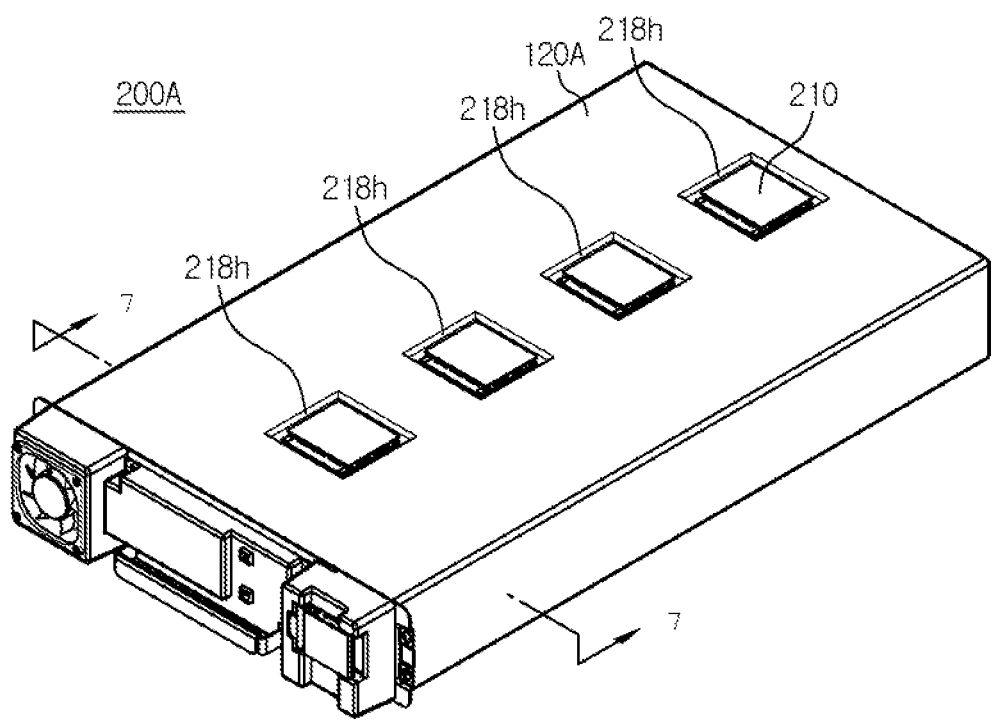
FIG. 6 is a schematic perspective view of a battery pack according to another embodiment of the present disclosure.
Figure 7:
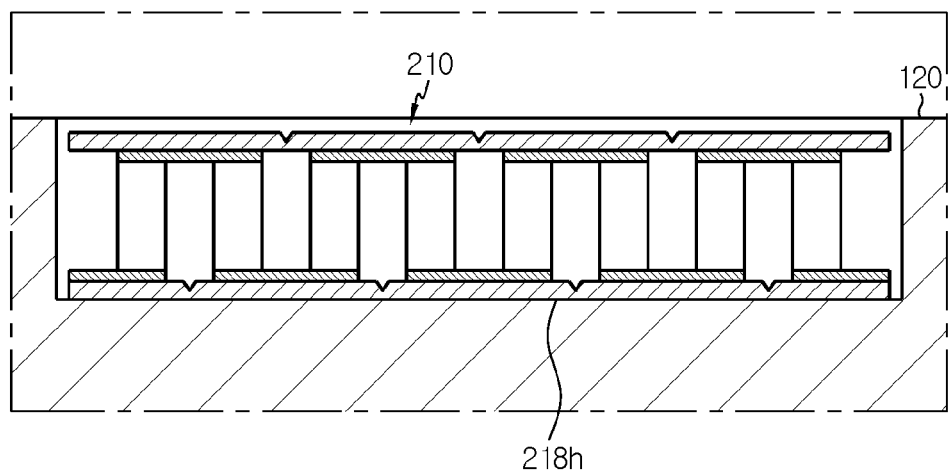
FIG. 7 is a schematic partial cross-sectional view of the battery pack of FIG. 6 taken along the line 7-7.

FIG. 6 is a schematic perspective view of a battery pack according to another embodiment of the present disclosure. FIG. 7 is a schematic partial cross-sectional view of the battery pack of FIG. 6 taken along the line 7-7.

Referring to FIGS. 6 and 7, when compared with the battery pack 200 of FIG. 1, the module housing 120A of the battery pack 200A according to another embodiment of the present disclosure may further include a receiving groove 218h recessed in the inward direction (inward of the battery module) to receive the thermoelectric module 210. The other components are the same.

For example, as shown in FIG. 6, the module housing 120A may have 4 receiving grooves 218h. The thermoelectric module 210 may be embedded in each of the 4 receiving grooves 218h. In this instance, the thermoelectric module 210 may be mounted on the receiving groove 218h such that the cold side substrate 216 (the upper substrate) may be disposed on the receiving groove 218h.

According to this configuration of the present disclosure, the module housing 120A has the receiving groove 218h recessed in the inward direction to receive the thermoelectric module 210 to prevent the thermoelectric module 210 from extending out of the battery module 100, thereby avoiding obstruction with an external object. Accordingly, it is possible to prevent the damage of the thermoelectric module 210.

The thermoelectric module 210 is disposed closer to the inside of the battery module 100 and around the inner wall of the receiving groove 218h, and thus the internal heat of the battery module 100 may be transmitted to the thermoelectric module 210 more effectively. Accordingly, when the temperature of the battery module 100 rises to the predetermined temperature or above, the energy drain unit 220 may drain the power of the battery module 100 rapidly.

Figure 8:
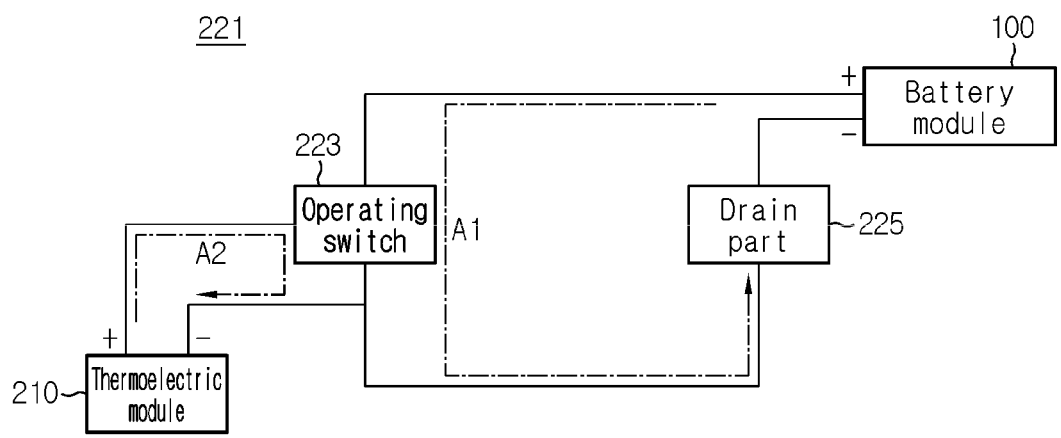
FIG. 8 is a schematic diagram of an external short-circuiting circuit of a battery pack according to an embodiment of the present disclosure.

FIG. 8 is a schematic diagram of an external short-circuiting circuit of the battery pack according to an embodiment of the present disclosure.

Referring to FIG. 8 together with FIG. 1, the energy drain unit 220 may include an external short-circuiting circuit 221. When the predetermined magnitude of voltage or above is applied from the thermoelectric module 210, the external short-circuiting circuit 221 may be electrically connected to an external power terminal of the battery module 100 and configured to drain the power of the battery module 100.

In detail, the external short-circuiting circuit 221 may include a short circuit path A1 electrically connecting a positive electrode terminal and a negative electrode terminal of the battery module 100, and an operation path A2 configured to allow the current of the thermoelectric module to flow to the operating switch. A drain part 225 and at least one operating switch 223 may be provided on the short circuit path A1. The drain part 225 may include a device configured to drain the power supplied from the battery module 100, for example, a power resistor, a resistor or a shunt resistor.

When the predetermined voltage or above is supplied along the operation path A2, the operating switch 223 may be configured to electrically connect the battery module 100 and the drain part 225. The operating switch 223 may be turned on reversibly or irreversibly.

According to this configuration of the present disclosure, the energy drain unit 220 includes the external short-circuiting circuit 221 including the drain part 225 and at least one operating switch 223, to allow the operating switch 223 to electrically connect the battery module 100 and the drain part 225 by the predetermined voltage or above transmitted by the thermoelectric module 210, in order to effectively drain the power of the battery module 100.

Figure 9:
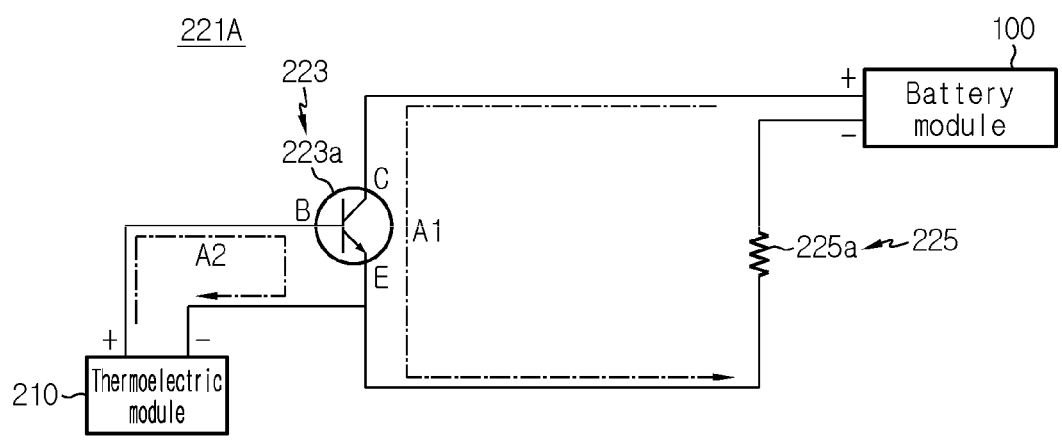
FIG. 9 is a schematic diagram of an external short-circuiting circuit of a battery pack according to an embodiment of the present disclosure.

FIG. 9 is a schematic diagram of the external short-circuiting circuit of the battery pack according to an embodiment of the present disclosure.

Referring to FIG. 9, the external short-circuiting circuit 221A of the present disclosure may include a transistor switch 223a as the operating switch 223.

When the transistor switch 223a is supplied with electricity of the predetermined voltage or above from the thermoelectric module 210, the transistor switch 223a may be configured to electrically connect the battery module 100 to the resistor 225a. Here, the transistor switch 223a may be a bipolar junction transistor (BJT).

For example, as shown in FIG. 9, the operating switch 223 of FIG. 9 may be provided as a transistor switch. In this instance, the positive electrode terminal and the negative electrode terminal of the thermoelectric module 210 may be respectively connected to the base B and the emitter E of the transistor switch 223a. The positive electrode terminal and the negative electrode terminal of the battery module 100 may be respectively connected to the collector C and the emitter E of the transistor switch 223a.

In this case, when the predetermined voltage or less is applied to the base B, the transistor switch 223a is shut off (shut-off mode) to keep the switch in turn-off state to prevent the flow of current from the collector C to the emitter E.

When the predetermined voltage or above is applied to the base B, the transistor switch 223a is shifted to the turn-on state to allow the current to flow from the collector C to the emitter E. In this instance, the power of the battery module 100 may be electrically connected to the resistor 225a disposed on the short circuit path A1. Accordingly, the power of the battery module 100 may be quickly drained by the resistor 225a of the drain part 225.

Accordingly, when the temperature of the battery module 100 rises to the predetermined temperature or above, the thermoelectric module 210 may generate the predetermined voltage or above. The predetermined voltage or above generated from the thermoelectric module 210 may be applied to the base of the transistor switch 223a, leading to saturation, and the switch may be turned on to allow the current flow from the collector C to the emitter E. Accordingly, the current may flow in the short circuit path A1 and the power of the battery module 100 may be quickly drained through the resistor 225a.

A plurality of transistor switches 223a may be provided according to the magnitude of the current of the power of the battery module 100. For example, when the current of the power of the battery module 100 is 400 A, the external short-circuiting circuit 221 A may include 2 transistor switches having the operating current of 200 A.

According to this configuration of the present disclosure, when the operating switch 223 is a transistor switch configured to electrically connect the battery module 100 to the resistor 225a upon receiving electricity of the predetermined voltage or above from the thermoelectric module 210, the switching operation is faster, resulting in faster power drain of the battery module 100. The transistor switch is resistant to wear, thereby preventing the switch from becoming inoperable.

Although the embodiment of FIG. 9 describes the transistor switch based on BJT, the transistor switch is not necessarily limited thereto and may include other types of switching devices, for example, field effect transistors (FETs).

Figure 10:
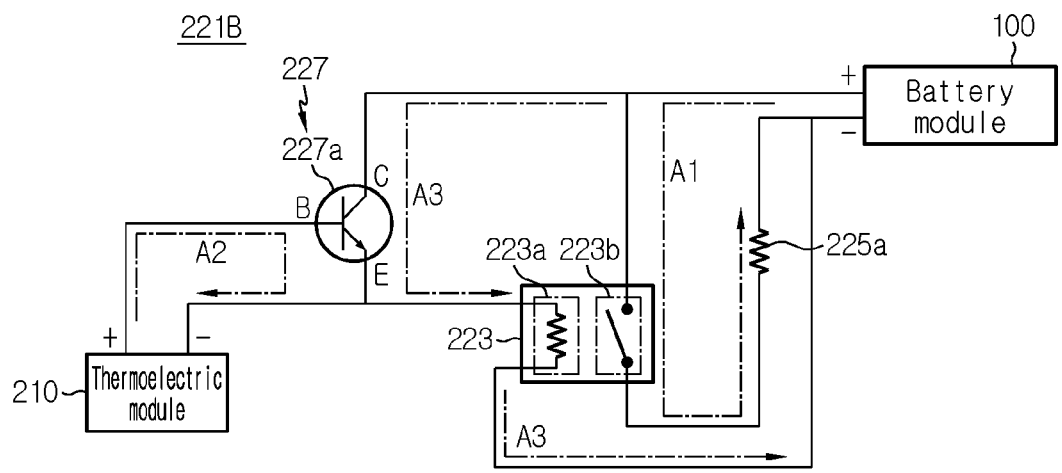
FIG. 10 is a schematic diagram of an external short-circuiting circuit of a battery pack according to another embodiment of the present disclosure.

FIG. 10 is a schematic diagram of an external short-circuiting circuit of a battery pack according to another embodiment of the present disclosure.

Referring to FIG. 10, as opposed to the external short-circuiting circuit 221A of FIG. 9, the external short-circuiting circuit 221B according to another embodiment may further include a switch path A3 in the operating switch 223 to connect the positive electrode terminal and the negative electrode terminal of the battery module 100.

The external short-circuiting circuit of FIG. 10 may further include a changing switch 227 disposed on the switch path A3. The changing switch 227 may be configured to be turned on when supplied with the predetermined voltage or above from the thermoelectric module 210. For example, the changing switch 227 may be a transistor switch that is turned on when the predetermined voltage or above is applied.

For example, as shown in FIG. 10, the changing switch 227 may be provided as a transistor switch. In this instance, the positive electrode terminal and the negative electrode terminal of the thermoelectric module 210 may be respectively connected to the base B and the emitter E of the transistor switch 227a. The positive electrode terminal and the negative electrode terminal of the battery module 100 may be respectively connected to the collector C and the emitter E of the transistor switch 227a.

Accordingly, the changing switch 227 may be configured to supply the power of the battery module 100 to the operating switch 223 when turned on. In this instance, the operating switch 223 may include a driving part 223a and an opening/closing part 223b disposed on the switch path A3 and the short circuit path A1 respectively. That is, the driving part 223a may be configured to drive the opening/closing of the opening/closing part 223b. The driving part 223a may be disposed on the switch path A3 to receive the predetermined voltage or above from the battery module 100. The opening/closing part 223b of the operating switch 223 may be kept in open state while in normal condition, to keep the operating switch 223 in turn-off state to prevent the current from flowing in the short circuit path A1. However, when the predetermined voltage or above is applied to the driving part 223a, the opening/closing part 223b may be turned on. Accordingly, the current may be allowed to flow in the short circuit path A1.

In this instance, when the power of the battery module 100 applied to the operating switch 223 is the predetermined voltage or above, the operating switch 223 may be turned on. When the operating switch 223 is turned on, the battery module 100 and the resistor 225a may be electrically connected to each other. Accordingly, the power of the battery module 100 may be quickly drained by the resistor 225a.

For example, even when the predetermined voltage or above is applied only once, the operating switch 223 may be turned on, and kept in the turn-on state. That is, the operating switch 223 may be a safety switch that irreversibly works. For example, the operating switch 223 may be a pyro fuse from autoliv.

According to this configuration of the present disclosure, the external short-circuiting circuit 221B further includes the changing switch 227 that is turned on when supplied with the predetermined voltage or above from the thermoelectric module 210, to supply the power of the battery module 100 to the operating switch 223 in order to turn on the operating switch 223, so that the operating switch 223 electrically connects the battery module 100 to the resistor 225a by the predetermined voltage or above transmitted by the battery module 100, thereby inducing an external short circuit with high reliability. Accordingly, it is possible to effectively drain the power of the battery module 100.

Moreover, as opposed to the external short-circuiting circuit 221A of FIG. 9, in the external short-circuiting circuit 221B of the present disclosure shown in FIG. 10, the operating switch 223 and the changing switch 227 may include different types of switches to change the range of operating voltage in which the switch is turned on. That is, it is possible to reduce the range of voltage in which the switch of the changing switch 227 electrically connected to the thermoelectric module 210 is turned on. On the contrary, the operating switch 223 may be configured to have a high operating voltage or current range, so a small number of operating switches 223 is provided even when high voltage or current of the battery module 100 flows.

In other words, the present disclosure differently uses the switch that can be turned on by the voltage of the thermoelectric module 210 and the switch that can be turned on by the power of the battery module 100, thereby achieving more efficient design and production cost savings and increasing the operation reliability of the switch.

Figure 11:
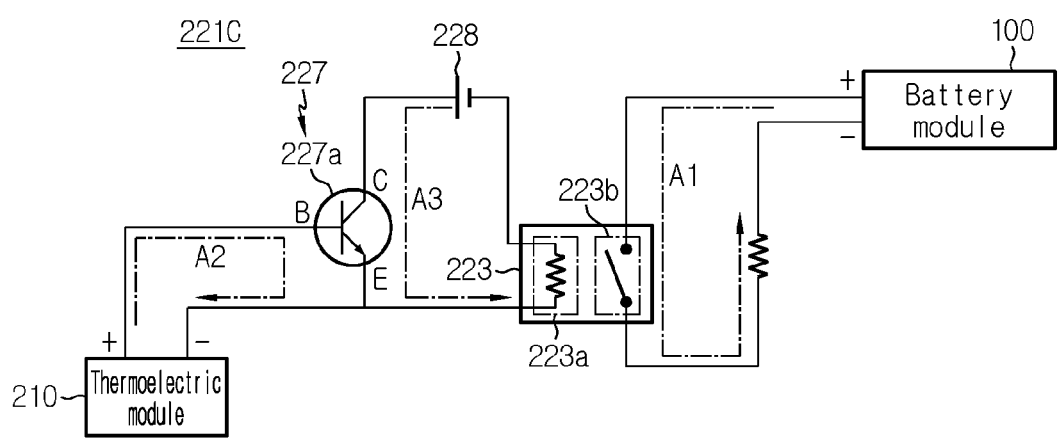
FIG. 11 is a schematic diagram of an external short-circuiting circuit of a battery pack according to another embodiment of the present disclosure.

FIG. 11 is a schematic diagram of an external short-circuiting circuit of a battery pack according to another embodiment of the present disclosure.

Referring to FIG. 11, when compared with the external short-circuiting circuit 221B of FIG. 10, the external short-circuiting circuit 221C according to another embodiment may further include an auxiliary battery 228 disposed on the switch path A3 to supply the predetermined voltage or above to the operating switch 223.

The auxiliary battery 228 may be configured to supply the predetermined voltage or above to the operating switch 223. In this instance, the predetermined voltage or above may be a magnitude that is high enough to turn on the operating switch 223. When the temperature of the battery module 100 rises to the predetermined temperature or above, the external short-circuiting circuit 221C may include the changing switch 227 configured to be turned on when supplied with the predetermined voltage or above from the thermoelectric module 210.

That is, the changing switch 227 may be configured to supply the power of the auxiliary battery 228 to the operating switch 223 when turned on. In this instance, the operating switch 223 may include the driving part 223*a* and the opening/closing part 223*b* disposed on the switch path A3 and the short circuit path A1 respectively. The driving part 223*a* may be configured to drive the opening/closing of the opening/closing part 223*b*. The driving part 223*a* may be disposed on the switch path A3 to receive the predetermined voltage or above from the auxiliary battery 228. When the opening/closing part 223*b* of the operating switch 223 is in normal condition, the operating switch 223 may be kept in turn-off state to prevent the current from flowing in the short circuit path A1. When the predetermined voltage or above is applied from the auxiliary battery 228 to the driving part 223*a*, the opening/closing part 223*b* may be configured to turn on (close) the switch to allow the current to flow along the short circuit path A1. Accordingly, the power of the battery module 100 may be quickly drained by the resistor 225*a*.

Here, the changing switch 227 may include a transistor switch 227*a*. When the predetermined voltage or less is applied, the transistor switch 227*a* is shut off (shut-off mode) to turn off the switch in order to allow the current to flow from the base B to the emitter E.

The transistor switch 227*a* is turned on to allow the current to flow from the collector C to the emitter E when the predetermined voltage or above is applied to the base B. In this instance, the power of the auxiliary battery 228 may be supplied to the driving part 223*a* of the operating switch 223 disposed on the switch path A3.

For example, as shown in FIG. 11, the positive electrode terminal and the negative electrode terminal of the thermoelectric module 210 may be respectively connected to the base B and the emitter E of the transistor switch 227*a*. The positive electrode terminal and the negative electrode terminal of the auxiliary battery 228 may be respectively connected to the collector C and the emitter E of the transistor switch 227*a*.

The operating switch 223 may be turned on when supplied with the predetermined voltage or above from the auxiliary battery 228. The operating switch 223 may electrically connect the battery module 100 to the resistor 225*a* when turned on. Accordingly, the power of the battery module 100 may be quickly drained by the resistor 225*a*.

Figure 12:
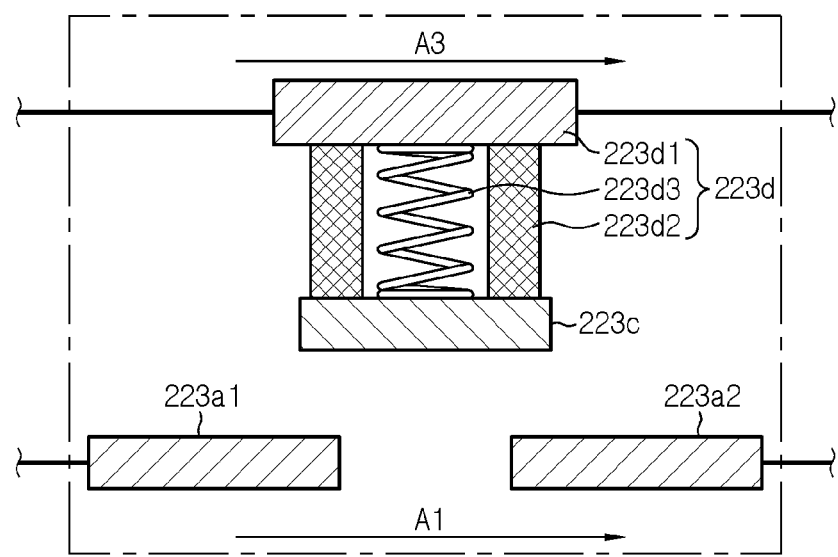
FIGS. 12 and 13 are schematic diagrams showing the operation of the internal components of an operating switch of an external short-circuiting circuit according to an embodiment of the present disclosure.
Figure 13:
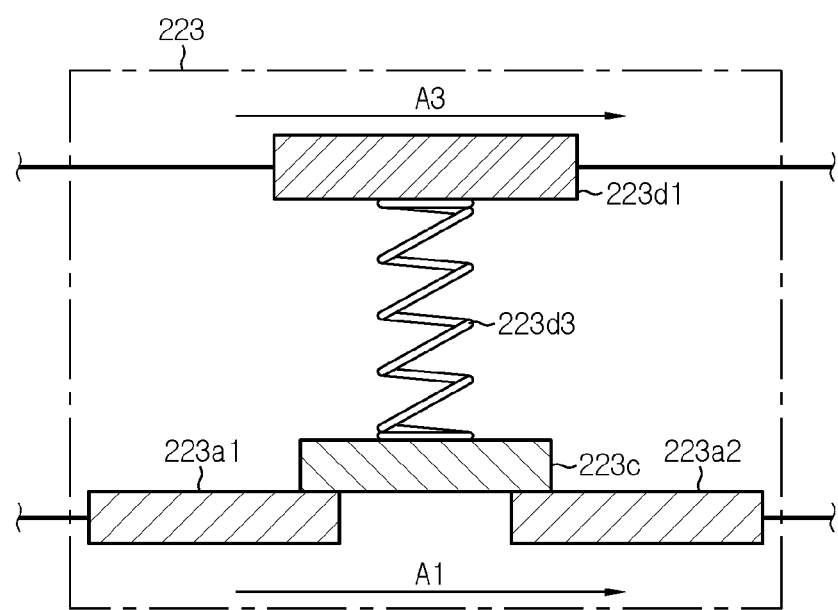

FIGS. 12 and 13 are schematic diagrams showing the operation of the internal components of the operating switch of the external short-circuiting circuit according to an embodiment of the present disclosure.

Referring to FIGS. 12 and 13 together with FIG. 8, the operating switch 223 according to an embodiment of the present disclosure may include a positive electrode connection part 223*a*1, a negative electrode connection part 223*a*2, a connecting bar 223*c*, and a movement element 223*d*.

In detail, the positive electrode connection part 223*a*1 may be electrically connected to the positive electrode terminal of the battery module 100 or the auxiliary battery 228. The negative electrode connection part 223*a*2 may be electrically connected to the negative electrode terminal of the battery module 100 or the auxiliary battery 228. The connecting bar 223*c* may be configured to electrically connect the positive electrode connection part 223*a*1 to the negative electrode connection part 223*a*2. For example, the connecting bar 223*c* may have one end configured to come into contact with the positive electrode connection part 223*a*1, and the other end configured to come into contact with the negative electrode connection part 223*a*2.

The positive electrode connection part 223*a*1, the negative electrode connection part 223*a*2 and the connecting bar 223*c* may include an electrically conductive metal. For example, the metal may be an alloy including aluminum, nickel or copper.

The movement element 223*d* may configured to move the connecting bar 223*c*. When power of the predetermined voltage or above is supplied to the changing switch 227, the movement element 223*d* may be configured to allow the connecting bar 223*c* to come into contact between the positive electrode connection part 223*a*1 and the negative electrode connection part 223*a*2. The movement element 223*d* will be described in further detail below.

According to this configuration of the present disclosure, as the operating switch 223 includes the positive electrode connection part 223*a*1, the negative electrode connection part 223*a*2, the connecting bar 223*c* and the movement element 223*d*, it is possible to electrically connect the battery module 100 to the resistor 225*a* by the passive method. Accordingly, the operating switch 223 is turned on by applying the predetermined voltage or above to the operating switch 223 without any separate control of the BMS, thereby quickly draining the power of the battery module 100.

Referring back to FIGS. 12 and 13, the movement element 223*d* may include a heating body 223*d*1, a phase change element 223*d*2 and a press spring 223*d*3.

The heating body 223*d*1 may be configured to have a temperature increase to the predetermined temperature or above by the power supplied from the operating switch 223. For example, the heating body 223*d*1 may be a heater having a resistance coil to convert electricity into heat.

The phase change element 223*d*2 may change the phase from solid state to liquid state at the predetermined temperature or above. The phase change element 223*d*2 may have one end connected to the heating body 223*d*1 and the other end connected to the connecting bar 223*c*. For example, as shown in FIG. 12, the upper end of the phase change element 223*d*2 may be connected to the lower surface of the heating body 223d1, and the lower end of the phase change element 223d2 may be connected to the upper surface of the connecting bar 223c. To this end, the phase change element 223d2 may be made of a phase change material that changes the phase from solid state to liquid state at the predetermined temperature, for example, 100° C. or above.

The phase change material may typically include paraffin, polyethylene glycol and inorganic hydrate (for example, $Na_2HPO_4.12H_2O$, $Na_2SO_4.10H_2O$, $Zn(NO_3)_2.6H_2O$), but is not limited thereto. Among them, paraffin is especially desirable since it is cheap and easy to adjust the phase change temperature according to the molecular weight.

The press spring 223d3 may have one end connected to the connecting bar 223c and the other end connected to the heating body 223d1. The press spring 223d3 may be kept in compressed state by the phase change element 223d2 connected to the heating body 223d1 and the connecting bar 223c. The press spring 223d3 may press to move the connecting bar 223c when the phase change element 223d2 changes the phase into liquid state.

That is, when the phase change element 223d2 changes the phase into liquid state, the phase change element 223d2 is separated from the connecting bar 223c, the connecting bar 223c constrained by the phase change element 223d2 is released and the connecting bar 223c may move by the compressive force of the press spring 223d3. The connecting bar 223c may be moved to come into contact with each of the positive electrode connection part 223a1 and the negative electrode connection part 223a2.

According to this configuration of the present disclosure, the movement element 223d includes the heating body 223d1, the phase change element 223d2 and the press spring 223d3, to electrically connect the battery module 100 to the resistor 225a. Accordingly, the operating switch 223 is turned on by applying the predetermined voltage or above to the operating switch 223 without any separate control of the BMS, thereby quickly draining the power of the battery module 100.

Figure 14:
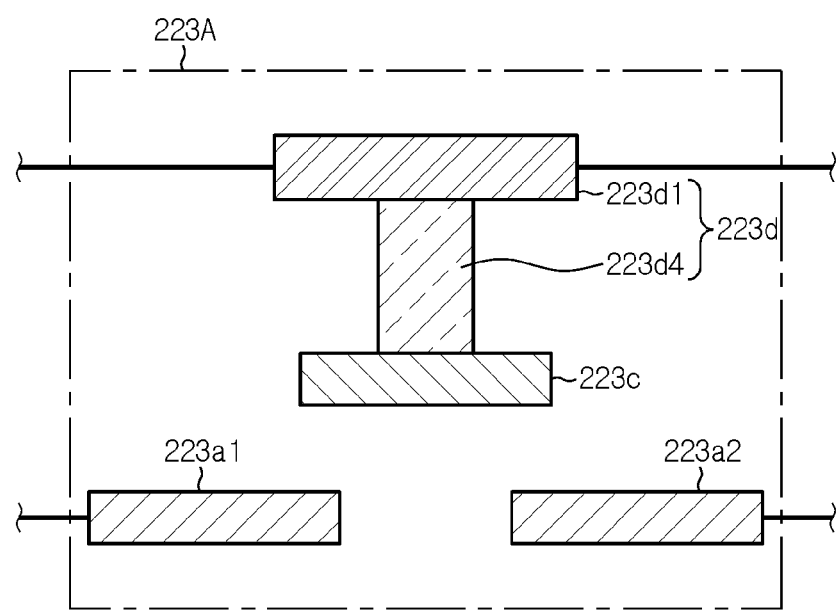
FIGS. 14 and 15 are schematic diagrams showing the operation of the internal components of an operating switch of an external short-circuiting circuit according to another embodiment of the present disclosure.
Figure 15:
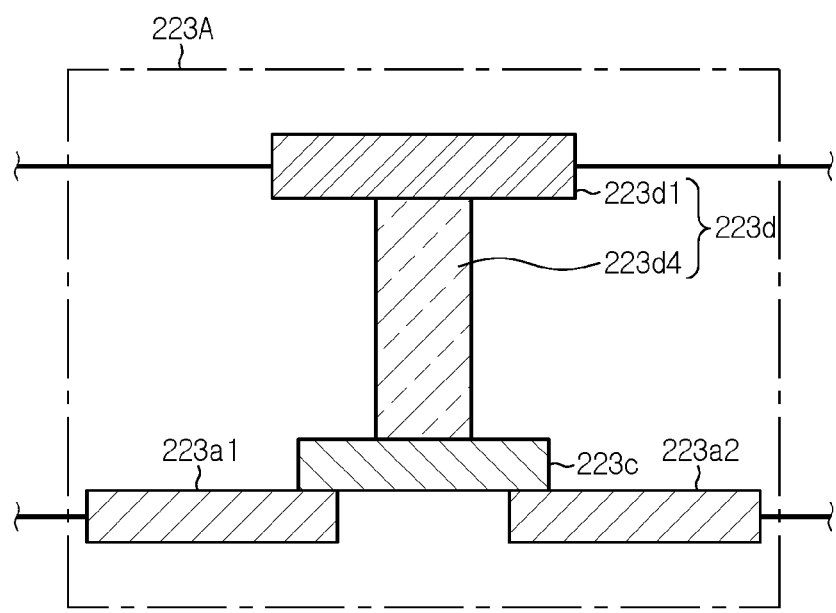

FIGS. 14 and 15 are schematic diagrams showing the operation of the internal components of an operating switch of an external short-circuiting circuit according to another embodiment of the present disclosure.

Referring to FIGS. 14 and 15, the operating switch 223A of the external short-circuiting circuit according to another embodiment of the present disclosure may include a movement element 223d including a heating body 223d1 and an expandable part 223d4. The heating body 223d1 may be configured to have a temperature increase to the predetermined temperature or above by the power supplied to the operating switch 223. For example, the heating body 223d1 may be a heater having a resistance coil to convert electricity into heat.

The expandable part 223d4 may have one end connected to the heating body 223d1 and the other end connected to the connecting bar 223c. For example, as shown in FIG. 14, the expandable part 223d4 may have the upper end connected to the lower surface of the heating body 223d1 and the lower end connected to the upper surface of the connecting bar 223c.

The expandable part 223d4 may be configured to expand the volume at the predetermined temperature or above. For example, the expandable part 223d4 may include an expandable material that expands the volume at the predetermined temperature or above. The expandable material may include a material that expands at the predetermined temperature, for example, at the temperature of 100° C. or above. For example, the expandable material may be a polymer or a metal. Preferably, the expandable material may be polyethylene, nylon or an aluminum alloy.

When the temperature rises to the predetermined temperature or above by the conduction of heat from the heating body 223d1, the expandable part 223d4 may be configured to expand the volume and move the connecting bar 223c. For example, the expandable part 223d4 may move the connecting bar 223c so that the connecting bar 223c comes into contact with each of the positive electrode connection part 223a1 and the negative electrode connection part 223a2.

According to this configuration of the present disclosure, the movement element 223d includes the heating body 223d1 and the expandable part 223d4, and when the heating body 223d1 is heated by the applied power, the expandable part 223d4 connected to the heating body 223d1 expands the volume and moves the connecting bar 223c, and the moved connecting bar 223c electrically connects the battery module 100 to the resistor 225a. Accordingly, the operating switch 223 is turned on by applying the predetermined voltage or above to the operating switch 223 without any separate control of the BMS, thereby quickly draining the power of the battery module 100.

Figure 16:
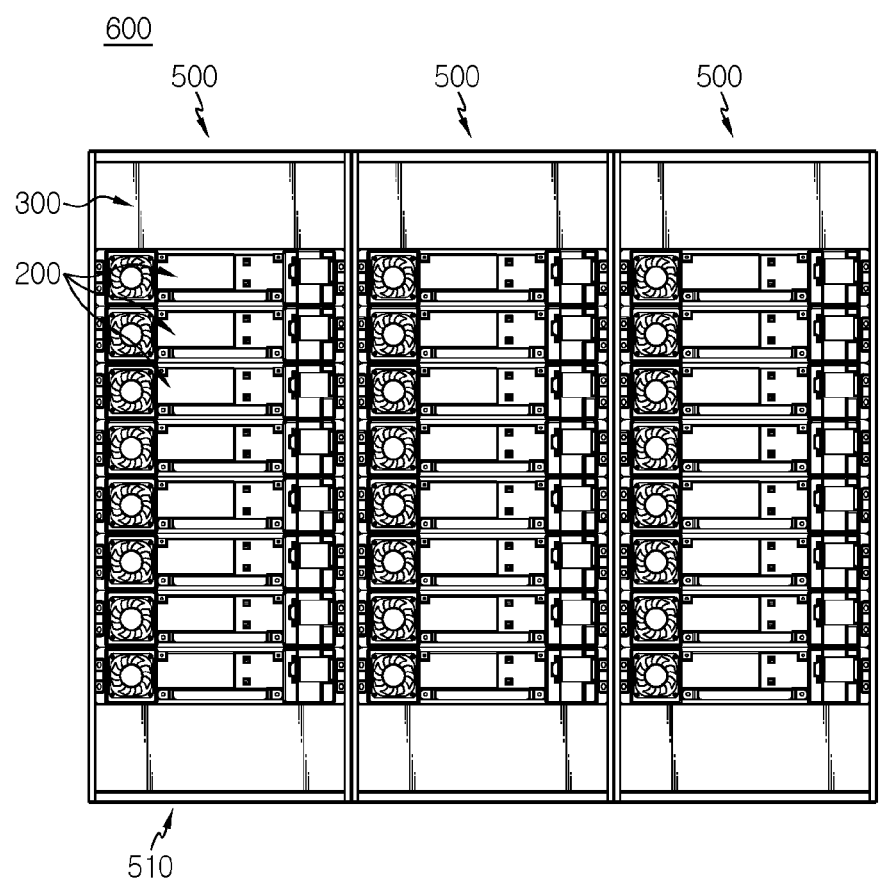
FIG. 16 is a schematic front view of an energy storage system according to an embodiment of the present disclosure.

FIG. 16 is a schematic front view of an energy storage system according to an embodiment of the present disclosure.

Referring to FIG. 16, a battery rack 500 according to an embodiment of the present disclosure may include a rack case 510 to receive a plurality of battery packs 200. The rack case 510 may be configured to receive the plurality of battery packs 200 stacked in the vertical direction. The battery pack 200 may be mounted in the rack case 510 such that the lower surface of the battery pack 200 is parallel to the horizontal plane.

Here, the horizontal direction refers to a direction parallel to the ground when the battery pack 200 is placed on the ground, and may be referred to as at least one direction on a plane perpendicular to the vertical direction.

The rack case 510 may have at least one open side, and the battery pack 200 may be inserted into the internal space through the open side. However, the open side of the rack case 510 may be closed.

The battery rack 500 may further include, for example, a central battery management apparatus 300 configured to control the charge/discharge of the plurality of battery packs 200. The battery management apparatus may be disposed inside or outside of the rack case 510.

The energy storage system 600 according to an embodiment of the present disclosure may include at least two battery racks 500. The two or more battery racks 500 may be arranged in a direction. For example, as shown in FIG. 16, the energy storage system 600 may include 3 battery racks 500 arranged in a direction. The energy storage system 600 may include a central controller (not shown) to control the charge/discharge of the 3 battery racks 500.

The terms indicating directions as used herein such as upper, lower, left, right, front and rear are used for convenience of description only, and it is obvious to those skilled in the art that the term may change depending on the position of the stated element or an observer.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

DESCRIPTION OF REFERENCE NUMERALS

200: Battery pack
100: Battery module
120: Module housing
110a: Battery cell
110: Cell assembly
125h: Exposure hole
210: Thermoelectric module
211, 211p, 211n: Thermoelectric leg
213: Electrode
215: Hot side substrate (lower substrate)
216: Cold side substrate (upper substrate)
218h: Receiving groove
220: Energy drain unit
221: External short-circuiting circuit
223: Operating switch
225: Drain part
227: Changing switch
223a1, 223a2: Positive electrode connection part, Negative electrode connection part
223c: Connecting bar
223d: Movement element
223d1: Heating body
223d2: Phase change element
223d3: Press spring
223d4: Expandable part
228: Auxiliary battery

INDUSTRIAL APPLICABILITY

The present disclosure relates to a battery pack. In addition, the present disclosure can be used in the industry related to a battery rack and an energy storage system comprising the battery pack.

What is claimed is:

1. A battery pack comprising:
at least one battery module including a plurality of battery cells, and a module housing to receive the plurality of battery cells;
at least one thermoelectric module disposed outside or inside of the module housing of the at least one battery module and configured to generate voltage when a temperature of the at least one battery module rises to a predetermined temperature or above; and
an energy drain configured to discharge the at least one battery module when a predetermined magnitude of voltage or above is applied from the at least one thermoelectric module.

2. The battery pack according to claim 1, wherein the module housing has at least one exposure hole that is open for communication between inside and outside, and
wherein the at least one thermoelectric module is disposed in contact with the exposure hole.

3. The battery pack according to claim 2, wherein the at least one thermoelectric module includes:
a thermoelectric leg including a p-type leg and an n-type leg;
an electrode connecting the p-type leg and the n-type leg; and
a hot side substrate and a cold side substrate formed in a plate shape and disposed at upper and lower positions of the electrode, respectively, to electrically isolate the electrode from outside.

4. The battery pack according to claim 3, wherein the at least one thermoelectric module is disposed outside of the module housing, and
wherein at least part of the hot side substrate is inserted into the exposure hole.

5. The battery pack according to claim 3, wherein the module housing has a receiving groove recessed in an inward direction to receive the at least one thermoelectric module, and
wherein the at least one thermoelectric module is mounted in the receiving groove such that the cold side substrate is disposed on the receiving groove.

6. The battery pack according to claim 1, wherein the energy drain includes an external short-circuiting circuit electrically connected to an external power terminal of the at least one battery module to drain power of the at least one battery module when the predetermined magnitude of voltage or above is applied from the at least one thermoelectric module.

7. The battery pack according to claim 6, wherein the external short-circuiting circuit includes:
a drain configured to drain the power supplied from the at least one battery module; and
at least one operating switch configured to electrically connect the at least one battery module to a resistor when the predetermined voltage or above is supplied.

8. The battery pack according to claim 7, wherein the external short-circuiting circuit further includes a changing switch that is turned on when supplied with the predetermined voltage or above from the at least one thermoelectric module, to supply the power of the at least one battery module to the operating switch in order to turn on the operating switch.

9. The battery pack according to claim 8, wherein the operating switch includes:
a positive electrode connection electrically connected to a positive electrode terminal of the at least one battery module;
a negative electrode connection electrically connected to a negative electrode terminal of the at least one battery module;
a connecting bar configured to electrically connect the positive electrode connection to the negative electrode connection; and
a movement element configured to move the connecting bar when the predetermined voltage or above is supplied to the changing switch, so that the connecting bar comes into contact between the positive electrode connection and the negative electrode connection.

10. The battery pack according to claim 9, wherein the movement element includes:
a heating body which rises to the predetermined temperature or above by the power supplied to the operating switch;
a phase change element having a first end connected to the heating body and a second end connected to the connecting bar, wherein the phase change element changes a phase from a solid state to a liquid state at the predetermined temperature or above; and
a press spring having a first end connected to the connecting bar and a second end connected to the heating body, and configured to move the connecting bar when the phase change element changes to the liquid state.

11. The battery pack according to claim 9, wherein the movement element includes:

a heating body which rises to the predetermined temperature or above by the power supplied to the operating switch; and an expandable part having a first end connected to the heating body and a second end connected to the connecting bar, and configured to move the connecting bar by volume expansion at the predetermined temperature or above.

12. The battery pack according to claim 7, wherein the external short-circuiting circuit includes:

an auxiliary battery to supply the predetermined voltage or above; and a changing switch that is turned on when supplied with the predetermined voltage or above from the at least one thermoelectric module, to supply the predetermined voltage or above of the auxiliary battery to the operating switch in order to turn on the operating switch.

13. The battery pack according to claim 7, wherein the operating switch is a transistor switch configured to electrically connect the at least one battery module to the resistor when supplied with the predetermined voltage or above from the at least one thermoelectric module.

14. A battery rack comprising the battery pack according to claim 1, and a rack case to receive the battery pack.

15. An energy storage system comprising at least one battery rack according to claim 14.

16. The battery pack according to claim 1, wherein the predetermined temperature is 100° C.

* * * * *